(12) United States Patent
Ota et al.

(10) Patent No.: US 7,073,640 B2
(45) Date of Patent: Jul. 11, 2006

(54) BRAKE STRUCTURE OF TRACTION MACHINE

(75) Inventors: Hitoshi Ota, Tokyo (JP); Akira Hashimoto, Tokyo (JP); Kazuhiro Shono, Tokyo (JP); Naoki Kajita, Tokyo (JP); Hisanori Uozumi, Tokyo (JP); Naoki Hashiguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/866,235

(22) Filed: Jun. 14, 2004

(65) Prior Publication Data
US 2004/0262102 A1  Dec. 30, 2004

(30) Foreign Application Priority Data
Jun. 27, 2003  (JP)  .............................. 2003-183651

(51) Int. Cl.
*B60T 13/04* (2006.01)
(52) U.S. Cl. ................................ 188/171; 188/196 BA
(58) Field of Classification Search ................ 188/171, 188/75, 196 BA
See application file for complete search history.

(56) References Cited

U.S. PATENT DOCUMENTS

| | | | | |
|---|---|---|---|---|
| 2,385,459 | A | * | 9/1945 | Nelson et al. ............... 318/366 |
| 2,467,891 | A | * | 4/1949 | Hollander ................... 188/171 |
| 3,584,710 | A | | 6/1971 | Frohlich |

FOREIGN PATENT DOCUMENTS

| | | | |
|---|---|---|---|
| DE | 14 75 356 | | 6/1969 |
| DE | 1 675 145 | | 7/1971 |
| JP | 2001343033 A | * | 12/2001 |
| JP | 2002-242961 | | 8/2002 |
| JP | 2002-303341 | | 10/2002 |

* cited by examiner

*Primary Examiner*—Melanie Torres
(74) *Attorney, Agent, or Firm*—Buchanan Ingersoll PC

(57) ABSTRACT

A brake structure of a traction machine includes a brake drum which is made rotatable about a shaft disposed on a rotary axis of the traction machine, and an electromagnetic brake unit built in an inner space of the brake drum. The electromagnetic brake unit includes a plurality of movable iron cores, a plurality of brake shoes located on the outside of the individual movable iron cores and joined thereto by connecting members, the brake shoes having curved outer surfaces facing a curved inner surface of the brake drum, and a one-piece formed stationary iron core block. The one-piece formed stationary iron core block has a plurality of stationary iron core portions joined to the individual movable iron cores via compression springs for forcing the individual brake shoes against the curved inner surface of the brake drum via the movable iron cores and the connecting members.

8 Claims, 7 Drawing Sheets

(a)

(b)

BRAKE STRUCTURE OF TRACTION MACHINE

BACKGROUND OF THE INVENTION

1. Field of the Invention

The present invention relates generally to a structure of a brake used in a traction machine or the like. More particularly, the invention is concerned with technology which makes it possible to improve stability of a braking force exerted by a brake of a traction machine or the like as well as stability of ON/OFF actions of the brake and to reduce assembly cost of the brake.

2. Description of the Background Art

Most of conventional traction machines employ an internal expanding brake structure. Typically, an internal expanding brake includes a pair of electromagnetic brake units fixed to a mounting plate, the electromagnetic brake units being disposed in an inner space of a brake drum.

A rotary shaft of a rotating body is fitted on a bearing which is fitted in the mounting plate. The brake drum and the rotating body are both fixed to the rotary shaft so that the brake drum and the rotating body together rotate as a single structure.

The brake drum rotates with its curved inner surface facing curved outer surfaces of brake shoes of the individual electromagnetic brake units.

Each of the electromagnetic brake units includes a stationary iron core on which a coil is wound and a movable iron core which is caused to move in a radial direction of the brake drum by an attractive force exerted by the stationary iron core. The brake shoe is attached to an outer end of the movable iron core via connecting members.

There are disposed compression springs between the stationary iron core and the movable iron core. These compression springs exert thrusting forces on the stationary iron core of each electromagnetic brake unit to force the brake shoes against the curved inner surface of the brake drum to brake the rotating body. When the coils of the electromagnetic brake units are excited, the stationary iron cores exert the attractive force on the respective movable iron cores to separate the brake shoes from the brake drum. Consequently, braking forces exerted by the brake shoes are released to allow the rotating body to rotate.

When braking the rotating body, the brake shoes forced against the brake drum receive a torque (turning force) exerted by the rotating brake drum in a rotating direction thereof. The torque thus exerted on each brake shoe could cause eventual breakage of the connecting members. An arrangement for avoiding breakage of the connecting members is disclosed in Japanese Laid-open Patent Publication No. 2002-303341, for example. According to the arrangement of the Publication, there are formed torque bearing parts protruding from the mounting plate up to and along both circumferential end surfaces of each brake shoe. The torque bearing parts act against the torque exerted on the brake shoes by supporting the circumferential end surfaces of the individual brake shoes.

In the aforementioned internal expanding brake structure of the conventional traction machines, the two separate electromagnetic brake units are fixed to the mounting plate. For this reason, there is always a possibility that the two electromagnetic brake units are relatively offset when installed. More specifically, a central position of the two electromagnetic brake units fixed to the mounting plate could be offset from the center of the brake drum in a particular radial direction of the brake drum. Such a displacement of the electromagnetic brake units could produce uneven contact surface pressures between the brake drum and the brake shoes resulting in a reduction in the braking force produced by the brake structure.

The torque bearing parts for supporting the circumferential end surfaces of the brake shoes protrude from the mounting plate up to and along the brake shoes taking up part of the inner space of the brake drum. Since the torque bearing parts occupy part of the inner space of the brake drum, the total cross-sectional area of the stationary and movable iron cores as viewed along an axial direction of the brake drum is reduced by as much as sectional areas occupied by the torque bearing parts. This reduction in the total cross-sectional area of the stationary and movable iron cores results in a decrease in the attractive force exerted by the stationary iron cores on the respective movable iron cores when electric currents flow through the coils, eventually causing a problem that ON/OFF actions of the brake become unstable.

Another problem of the aforementioned conventional brake structure is that the torque bearing parts need to be formed into a rather complicated structure which incurs an increase in manufacturing cost.

SUMMARY OF THE INVENTION

The present invention is intended to provide a solution to the aforementioned problems of the prior art. Accordingly, it is an object of the invention to provide such a structure of a brake of a traction machine that can be produced with a reduced manufacturing cost using a simplified assembly procedure.

It is another object of the invention to provide such a structure of a brake of a traction machine that makes it possible to produce a stable braking force by stabilizing contact surface pressures between a brake drum and brake shoes.

It is still another object of the invention to provide such a structure of a brake of a traction machine that makes it possible to produce stable ON/OFF actions of the brake with stationary and movable iron cores occupying a larger portion of an inner space of a brake drum.

According to the invention, a brake structure of a traction machine includes a brake drum which is made rotatable about a shaft disposed on a rotary axis of the traction machine, and an electromagnetic brake unit built in an inner space of the brake drum for braking the rotating brake drum. The electromagnetic brake unit includes a plurality of movable iron cores, a plurality of brake shoes located on the outside of the individual movable iron cores and joined thereto by connecting members, and a one-piece formed stationary iron core block. Curved outer surfaces of the brake shoes are positioned face to face with a curved inner surface of the brake drum. The one-piece formed stationary iron core block has a plurality of stationary iron core portions joined to the individual movable iron cores via compression springs for forcing the individual brake shoes outward against the curved inner surface of the brake drum via the movable iron cores and the connecting members.

The brake structure of the invention can be produced by a simple assembly procedure which can provide a reduced manufacturing cost.

These and other objects, features and advantages of the invention will become more apparent upon reading the following detailed description along with the accompanying drawings.

DESCRIPTION OF THE PREFERRED EMBODIMENTS

First Embodiment

Figure 1:
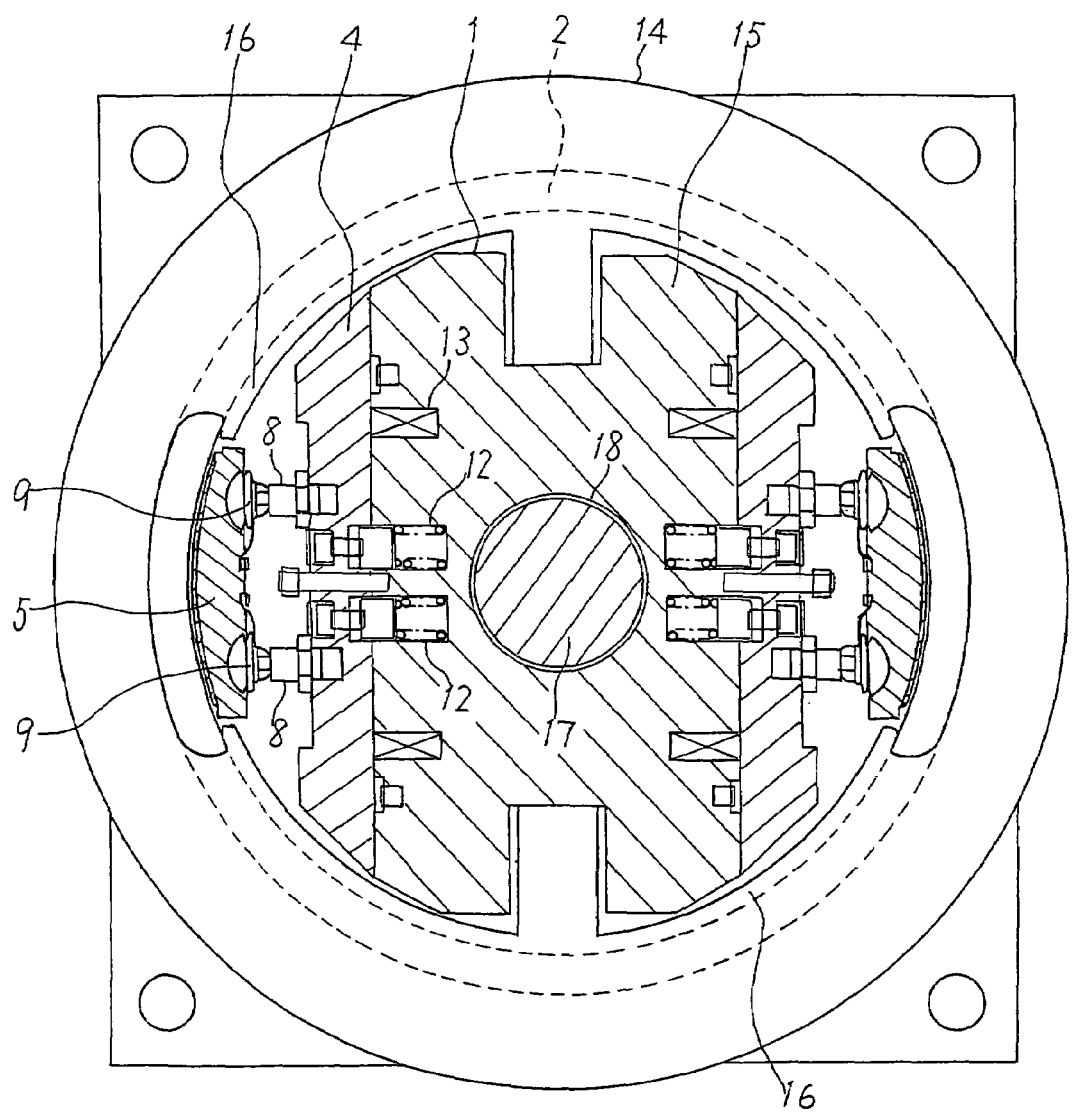
FIG. 1 is a plan view showing a brake structure of a traction machine according to a first embodiment of the invention.

FIG. 1 is a plan view showing a structure of a brake of a traction machine according to a first embodiment of the invention.

Referring to FIG. 1, the brake structure includes a cylindrical brake drum 2 which is fixedly attached to a rotating body of the traction machine and made rotatable about a central axis of a shaft 17 extending from a later-described housing 14 as well as an electromagnetic brake unit 1 disposed in an inner space of the brake drum 2. The electromagnetic brake unit 1 fixed in a nonrotatable manner includes a pair of movable iron cores 4 and a one-piece formed stationary iron core block 15. The stationary iron core block 15 has a pair of stationary iron core portions facing the individual movable iron cores 4.

The brake drum 2 is mounted on the shaft 17 with a bearing placed in between so that the brake drum 2 can rotate about the shaft 17.

There is formed a hole 18 at the center of the one-piece formed stationary iron core block 15 and the shaft 17 is firmly fitted into this hole 18 by shrink fit or expansion fit to assemble the electromagnetic brake unit 1 in an inner space of the housing 14 as illustrated in FIG. 1.

The electromagnetic brake unit 1 further includes a pair of brake shoes 5 of which curved outer surfaces are disposed face to face with a curved inner surface of the brake drum 2. Each of the brake shoes 5 is fixed to the movable iron core 4 by means of two each connecting members 8 and shoe supports 9.

There are disposed compression springs 12 between the one-piece formed stationary iron core block 15 and each movable iron core 4. The compression springs 12 force the two brake shoes 5 against the curved inner surface of the brake drum 2 to stop rotation of the brake drum 2.

The housing 14 is located at one end of the shaft 17 which constitutes an integral part of the housing 14. The housing 14 has on its inside multiple arc-shaped guiding parts 16 disposed along the curved inner surface of the brake drum 2. The guiding parts 16 are located such that circumferential end surfaces of each brake shoe 5 are positioned face to face with circumferential end surfaces of the guiding parts 16 as illustrated. When the brake shoes 5 are forced against the rotating brake drum 2, the circumferential end surfaces of the guiding parts 16 bear a torque exerted by the rotating brake drum 2 to prevent breakage of the connecting members 8 by supporting the circumferential end surfaces of the brake shoes 5.

To prevent breakage of the connecting members 8, the brake shoes 5 and the guiding parts 16 are relatively positioned in such a manner that there are formed gaps measuring a few tens of micrometers between the facing circumferential end surfaces of the brake shoes 5 and the guiding parts 16 for bearing the torque, although relative positioning accuracy required varies depending on the size of the connecting members 8.

Since the two stationary iron core portions are formed as integral parts of the single stationary iron core block 15 as stated above, it is possible to produce the brake by a simple assembly procedure which can provide a reduced manufacturing cost.

According to the embodiment, the one-piece formed stationary iron core block 15 includes the two stationary iron core portions as integral parts thereof and the electromagnetic brake unit 1 is assembled into the housing 14 when the shaft 17 extending from the housing 14 is fitted into the hole 18 formed in the stationary iron core block 15. As is apparent from the foregoing discussion, it is not necessary to affix separate electromagnetic brake units to a mounting plate in the aforementioned brake structure of the embodiment unlike the case of the earlier-described conventional internal expanding brake structure.

To produce a satisfactory level of braking force with the brake structure of the embodiment, it is desirable that the two movable iron cores 4 move exactly in radial directions of the brake drum 2 and radially press against the curved inner surface of the brake drum 2.

Figure 2:
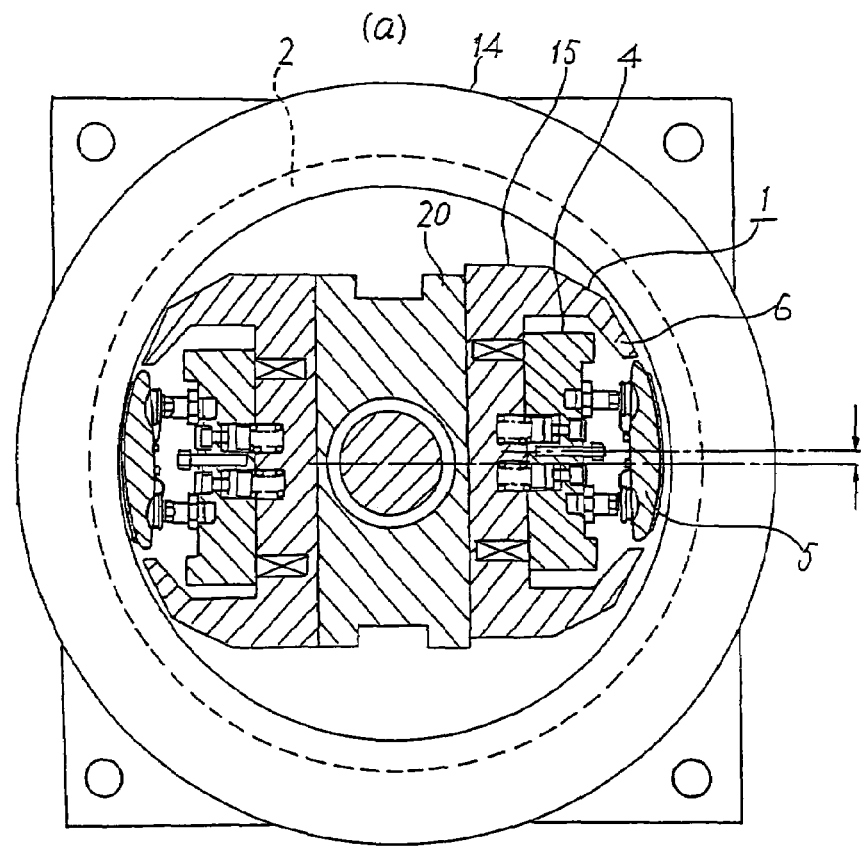
FIGS. 2A and 2B are plan views showing a conventional brake structure.
Figure 2:
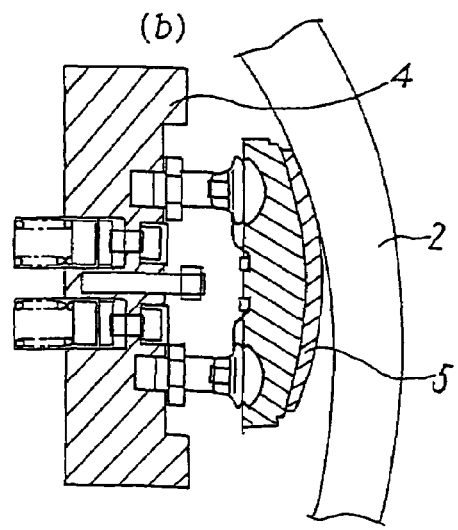

FIG. 2A is a plan view showing the aforementioned conventional brake structure, and FIG. 2B is an enlarged plan view showing one of brake shoe portions of the conventional brake structure. Referring to FIG. 2A, a pair of electromagnetic brake units 1 is fixed to a mounting plate 20 by means of fixing screws. If the central position of the two electromagnetic brake units 1 is offset from the center of a brake drum 2 in a vertical direction by a small amount as shown by arrows in FIG. 2A due to backlash between external threads formed on the fixing screws and internal threads that mate with the external threads, or for other reasons, brake shoes 5 would be displaced from their correct positions as shown in FIG. 2B, for instance. Should this situation occur, there will arise a problem that the brake shoes 5 are forced against the brake drum 2 under unbalanced pressure, causing a reduction in braking force or slippage of the brake shoes 5.

In the brake structure of the present embodiment, the electromagnetic brake unit 1 is precisely positioned as the shaft 17 of the housing 14 is fitted into the hole 18 formed in the one-piece formed stationary iron core block 15, so that the brake shoes 5 are not displaced as shown in FIGS. 2A and 2B. It is understood from the foregoing that the brake structure of the embodiment allows easy positioning of the electromagnetic brake unit 1 and produces a stable braking force.

Since the housing 14 has on its inside the arc-shaped guiding parts 16 located along the curved inner surface of the brake drum 2, the electromagnetic brake unit 1 can occupy a larger portion of the inner space of the brake drum 2, producing thereby stable ON/OFF actions of the brake.

In this embodiment, the arc-shaped guiding parts 16 are provided on the inside of the housing 14 and not on the brake drum 2. Therefore, after fitting the shaft 17 of the housing 14 into the hole 18 formed in the one-piece formed stationary iron core block 15, the gaps between the circumferential end surfaces of the brake shoes 5 and the facing circumferential end surfaces of the guiding parts 16 can be easily adjusted by turning the one-piece formed stationary iron core block 15. This makes it possible to reduce manufacturing cost incurred particularly in assembling the brake.

Furthermore, since the circumferential end surfaces of the guiding parts 16 can be positioned creating small gaps from the circumferential end surfaces of the brake shoes 5, it is possible to reduce the amount of flexing (bending) of the connecting members 8. Therefore, the diameter of the connecting members 8 can be reduced and this makes it possible to cut material and machining costs.

While the earlier-mentioned conventional brake structure includes torque bearing parts formed on the mounting plate 20, the arc-shaped guiding parts 16 are disposed along the curved inner surface of the brake drum 2 inside the housing 14 in the present embodiment. This brake structure of the embodiment makes it possible to efficiently use the inner surface of the brake drum 2 and stabilize the ON/OFF actions of the brake. This is because facing surface areas of the one-piece formed stationary iron core block 15 and the movable iron cores 4 can be increased so that the stationary iron core portions of the stationary iron core block 15 exert a large attractive force on the respective movable iron cores 4.

Moreover, the brake structure of the embodiment makes it possible to decrease the number of turns of coils 13 which are embedded in the stationary iron core portions of the one-piece formed stationary iron core block 15. This results in a reduction in the cost of production of the coils 13.

Second Embodiment

While the one-piece formed stationary iron core block 15 is fixed to the housing 14 by fixing the shaft 17 in the hole 18 formed in the stationary iron core block 15 by shrink fit or expansion fit, the stationary iron core block 15 may be fixed to the housing 14 by bolt joints.

Figure 3:
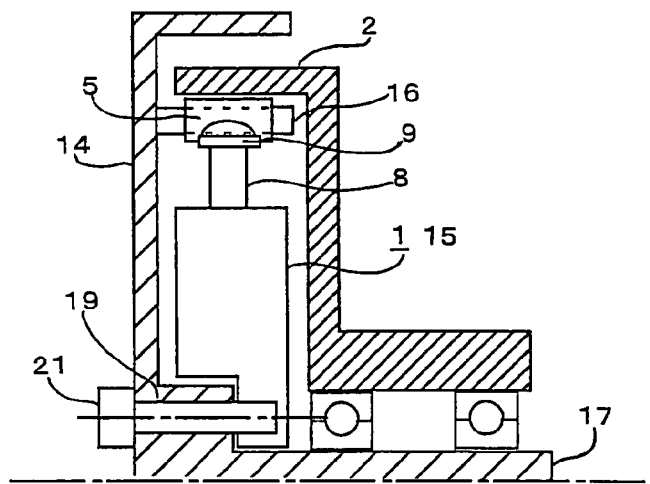
FIGS. 3A and 3B are fragmentary sectional side views showing a brake structure of a traction machine according to a second embodiment of the invention.
Figure 3:
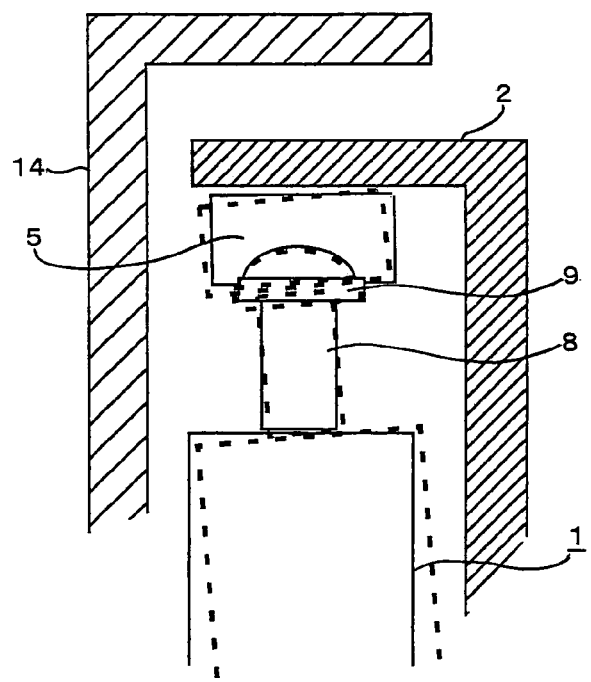

FIG. 3A is a fragmentary sectional side view showing a structure of a brake adapted to a traction machine according to a second embodiment of the invention, and FIG. 3B is an enlarged fragmentary sectional side view of the brake structure of the second embodiment, in which elements identical or similar to those of the first embodiment are designated by the same reference numerals.

In this embodiment, there is formed a flange 19 at a basal part of the shaft 17 extending from the housing 14, the flange 19 having a surface perpendicular to the central axis of the shaft 17. The one-piece formed stationary iron core block 15 is placed against the surface perpendicular to the central axis of the shaft 17 and fixed to the housing 14 by bolts 21 as shown in FIG. 3A.

The provision of the bolts 21 allows easier positioning of the stationary iron core block 15 with respect to the housing 14, contributing thereby to improving the yield of brakes in the manufacture of thereof.

When the one-piece formed stationary iron core block 15 is fixed to the housing 14, the stationary iron core block 15 is forced tight against the surface perpendicular to the central axis of the shaft 17. Thus, the stationary iron core block 15 becomes exactly at right angles to the shaft 17 so that the electromagnetic brake unit 1 will not be installed at a slant with respect to the central axis of the shaft 17 as shown by broken lines in FIG. 3B. The brake shoes 5 can therefore be forced against the brake drum 2 without creating irregular gaps therebetween. Consequently, the brake structure of the embodiment produces a large braking force.

Third Embodiment

Figure 4:
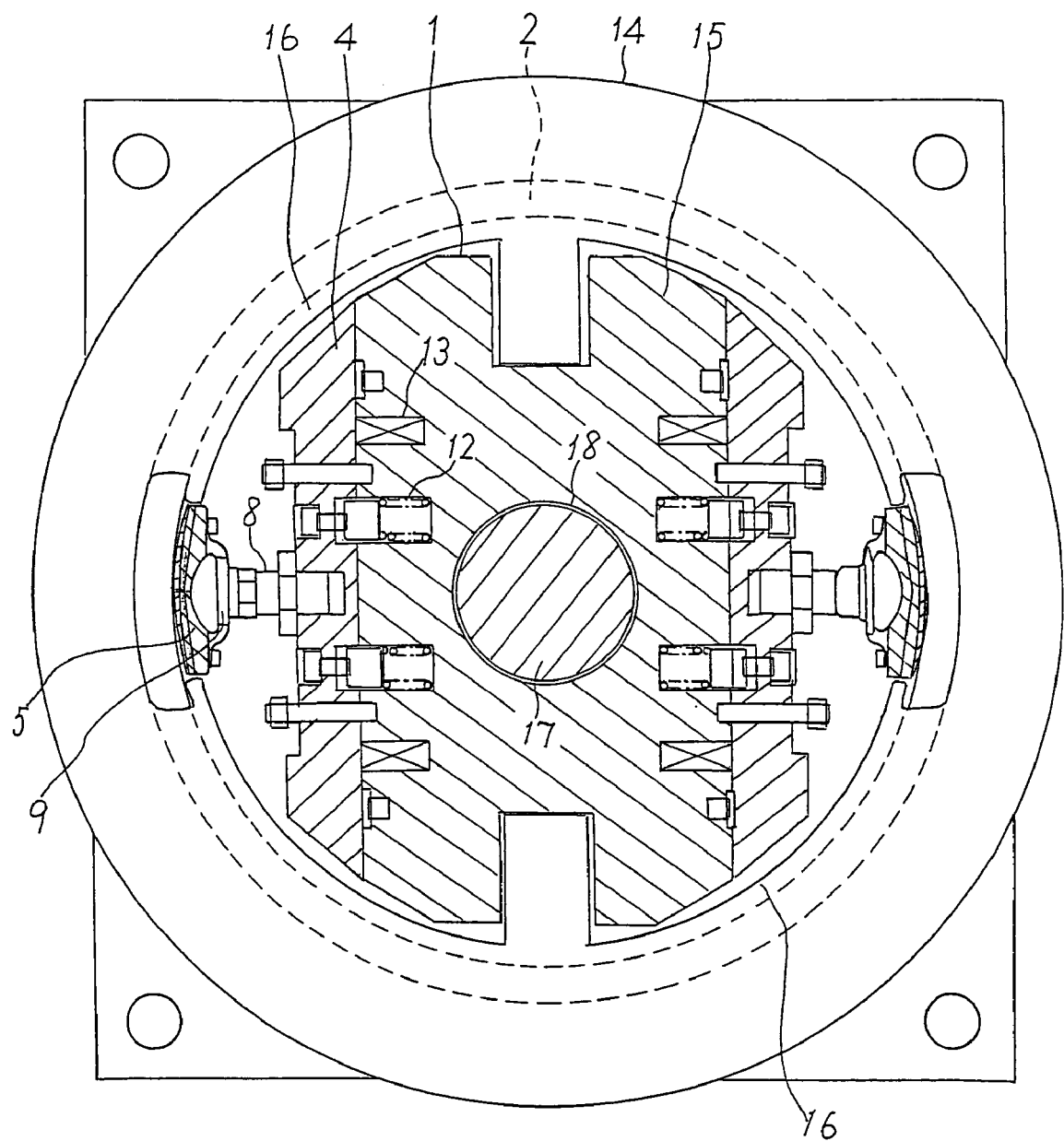
FIG. 4 is a plan view showing a brake structure of a traction machine according to a third embodiment of the invention.

FIG. 4 is a plan view showing a structure of a brake of a traction machine according to a third embodiment of the invention, in which elements identical or similar to those of the foregoing embodiments are designated by the same reference numerals.

While each brake shoe 5 is connected to the corresponding movable iron core 4 by a pair of shoe supports 9 in the brake structure of the first embodiment, each brake shoe 5 is supported by a single shoe support 9 joined to the movable iron core 4 by a single connecting member 8 in the brake structure of the third embodiment illustrated in FIG. 4.

As each brake shoe 5 is supported by one each shoe support 9 and connecting member 8, the brake shoes 5 can easily rotate, or swivel, in circumferential directions along the curved inner surface of the brake drum 2 and in a plane containing the central axis of the shaft 17. Even when a disturbance occurs to normal functioning of the brake, such as biting of dust or dirt between the brake drum 2 and the brake shoes 5, abnormal gaps are not created between the brake drum 2 and the brake shoes 5 due to swivel action of the brake shoes 5. Accordingly, the brake structure of this embodiment helps maintain stable contact between the brake drum 2 and the brake shoes 5 without creating irregular gaps and produce a specific level of braking force even in the presence of undesirable disturbances.

Fourth Embodiment

Figure 5:
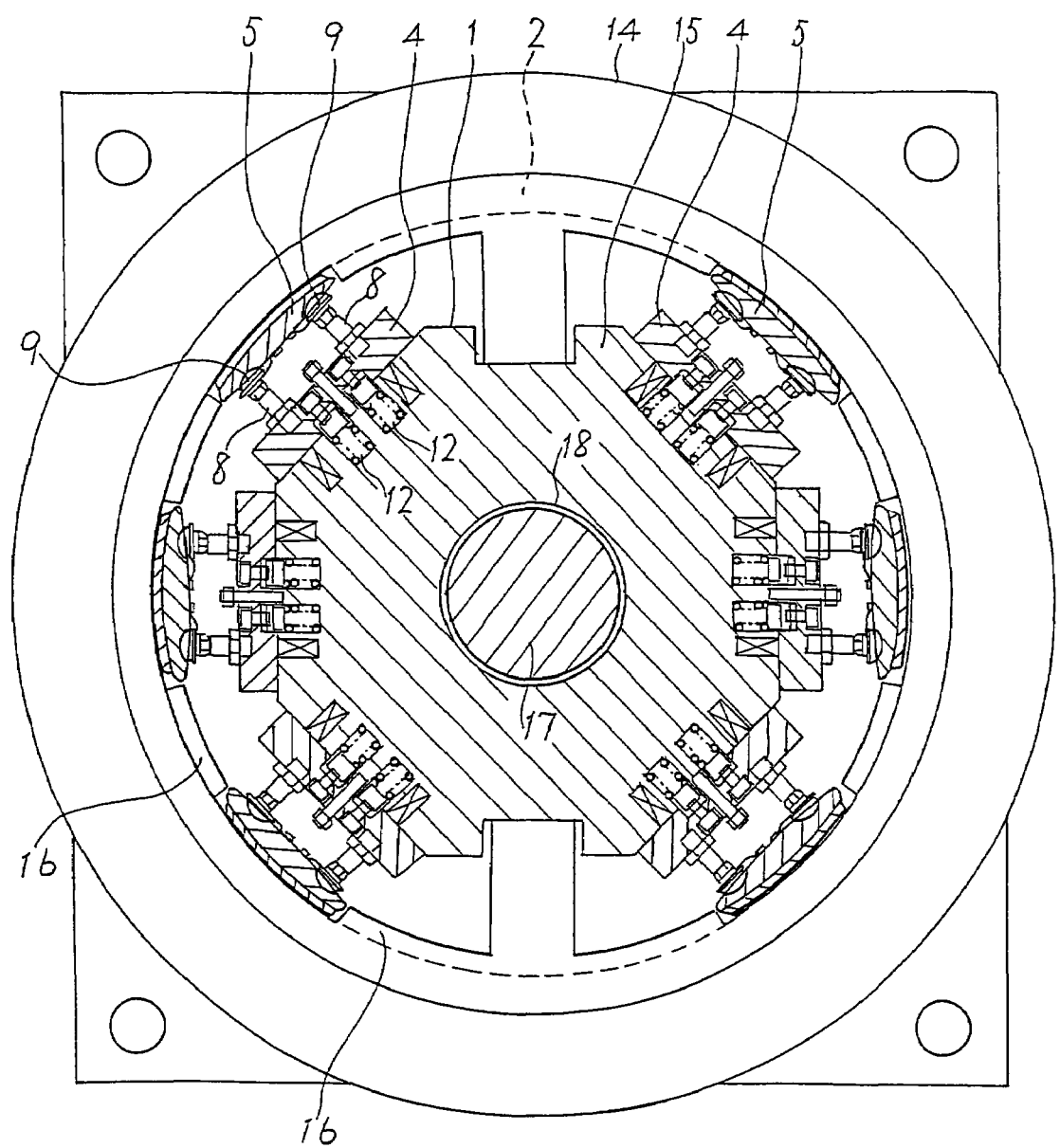
FIG. 5 is a plan view showing a brake structure of a traction machine according to a fourth embodiment of the invention.

FIG. 5 is a plan view showing a structure of a brake of a traction machine according to a fourth embodiment of the invention, in which elements identical or similar to those of the foregoing embodiments are designated by the same reference numerals.

The brake structures of the aforementioned first to third embodiments include two each movable iron cores 4 and brake shoes 5.

The brake structure of the fourth embodiment is characterized in that there are provided at least three each movable iron cores 4 and brake shoes 5. The brake structure actually includes six each movable iron cores 4 and brake shoes 5 in the illustrated example of FIG. 5. Since the electromagnetic brake unit 1 is easily assembled in the housing 14 by fitting the shaft 17 into the hole 18, it is possible to avoid a substantial increase in assembly cost regardless of an increase in the numbers of movable iron cores 4 and brake shoes 5.

A notable advantage of the fourth embodiment is that the brake structure can produce an increased braking force as a result of the increase in the number of brake shoes 5.

If the number of brake shoes 5 disposed inside the brake drum 2 is small, the brake drum 2 may deform into an elliptical shape creating irregular gaps between the brake drum 2 and the brake shoes 5 when the brake shoes 5 are forced against the brake drum 2. Such deformation of the brake drum 2 could result in a reduction in the braking force. If a larger number of brake shoes 5 are arranged along the curved inner surface of the brake drum 2 as shown in the example of FIG. 5, the brake drum 2 remains in an annular shape even when pressed outward by the brake shoes 5.

Thus, the brake structure of the embodiment helps maintain uniform contact between the brake drum 2 and the brake shoes 5 without creating undesirable gaps and produce a stable braking force regardless of the occurrence of a disturbance, such as biting of dust or dirt between the brake drum 2 and the brake shoes 5.

Generally, a thin film of water may form between the brake drum 2 and the brake shoes 5 due to condensation as a result of changes in environmental conditions such as ambient temperature. This can cause slippage of the brake shoes 5 along the inner surface of the brake drum 2. Since a larger number of brake shoes 5 are provided as illustrated, the brake structure of the present embodiment offers an increased safety factor and produce a stable braking force even in the presence of undesirable disturbances.

In addition, different types of compression springs 12 having different spring constants or different lengths may be fitted in a one-piece formed stationary iron core block 15 to adjust thrusting forces exerted by the compression springs 12 on the individual brake shoes 5. This arrangement makes it possible to regulate the shape of the brake drum 2 in such a manner that the brake drum 2 when deformed will suitably fit the shape of the brake shoes 5 and, as a consequence, the brake structure produces an increased braking force.

Fifth Embodiment

Figure 6:
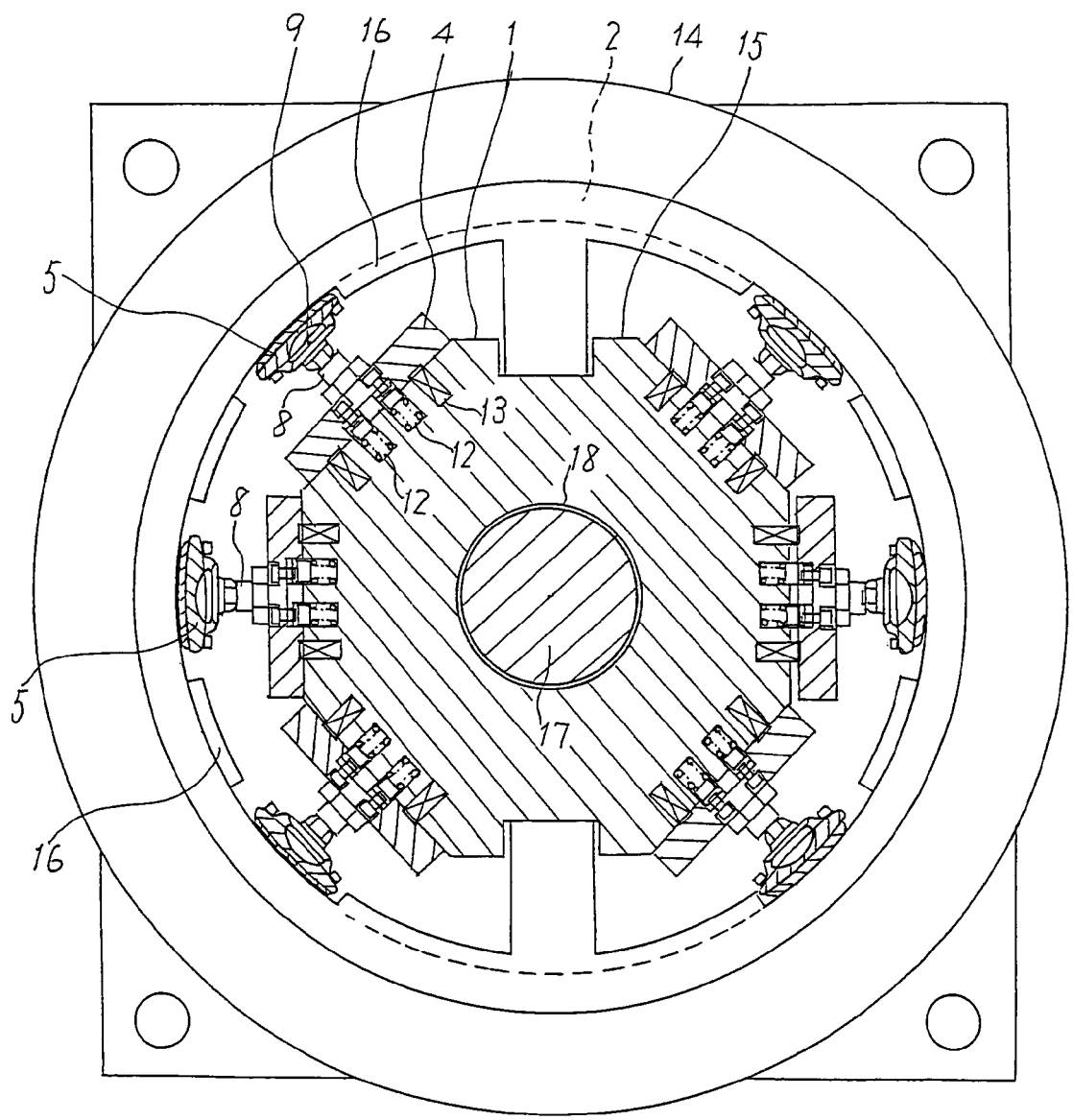
FIG. 6 is a plan view showing a brake structure of a traction machine according to a fifth embodiment of the invention.

FIG. 6 is a plan view showing a structure of a brake of a traction machine according to a fifth embodiment of the invention, in which elements identical or similar to those of the foregoing embodiments are designated by the same reference numerals.

While each brake shoe 5 is connected to the corresponding movable iron core 4 by two each shoe supports 9 and connecting members 8 in the brake structure of the fourth embodiment, each brake shoe 5 is supported by a single shoe support 9 joined to the movable iron core 4 by a single connecting member 8 in the brake structure of the fifth embodiment illustrated in FIG. 6.

As each brake shoe 5 is supported by one each shoe support 9 and connecting member 8, the brake shoes 5 can easily rotate, or swivel, in circumferential directions along the curved inner surface of the brake drum 2 and in a plane containing the central axis of the shaft 17. Even when a disturbance occurs to normal functioning of the brake, such as biting of dust or dirt between the brake drum 2 and the brake shoes 5, abnormal gaps are not created between the brake drum 2 and the brake shoes 5 due to swivel action of the brake shoes 5. Accordingly, the brake structure of this embodiment helps ensure stable contact between the brake drum 2 and the brake shoes 5 without creating irregular gaps and produce a specific level of braking force even in the presence of undesirable disturbances.

Sixth Embodiment

Figure 7:
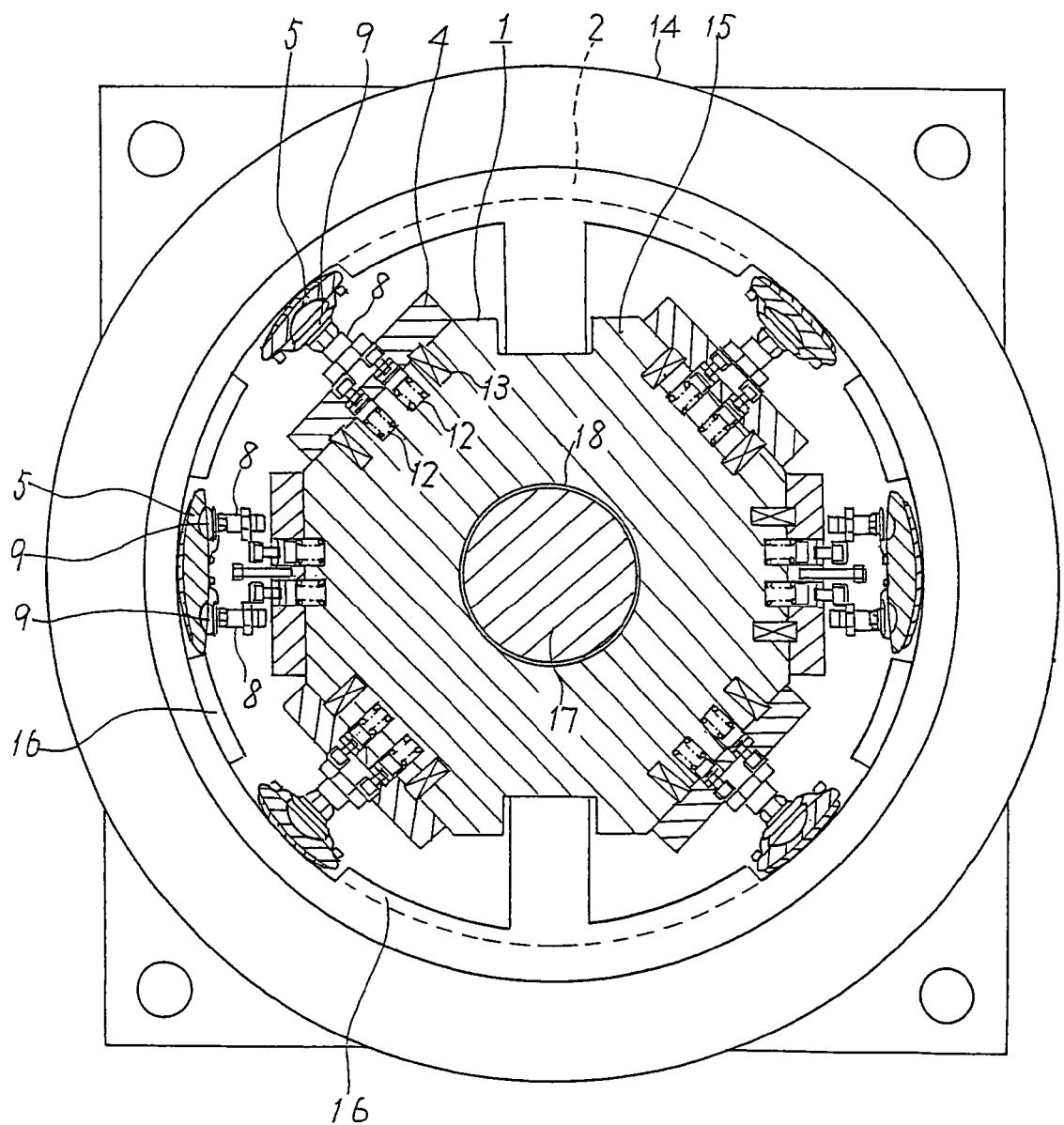
FIG. 7 is a plan view showing a brake structure of a traction machine according to a sixth embodiment of the invention.

FIG. 7 is a plan view showing a structure of a brake of a traction machine according to a sixth embodiment of the invention, in which elements identical or similar to those of the foregoing embodiments are designated by the same reference numerals.

In the aforementioned fourth embodiment, the compression springs 12 of different types (different spring constants or lengths) are used so that the brake drum 2 when deformed will suitably fit the shape of the brake shoes 5.

By comparison, the brake structure of the sixth embodiment employs the same type of compression springs 12 to apply thrusting forces to the brake shoes 5 to force them against the brake drum 2. However, the individual brake shoes 5 are supported by varying numbers of shoe supports 9 and connecting members 8 as illustrated in FIG. 7.

Provided that the individual brake shoes 5 are pressed against the brake drum 2 by the same thrusting force, a particular brake shoe 5 supported by a larger number of shoe supports 9 and connecting members 8 produces a reduced amount of maximum deformation of the brake drum 2 since the thrusting force (or a load exerted on the brake drum 2) is distributed over the circumferential length of the brake shoe 5.

In the illustrated example of the brake structure of the sixth embodiment, some (four in FIG. 7) of the brake shoes 5 are supported by one each shoe support 9 and connecting member 8 while the other are supported by two each shoe supports 9 and connecting members 8. In this arrangement, the amount of deformation of portions of the brake drum 2 forced by the brake shoes 5 supported by one each shoe support 9 and connecting member 8 is large, whereas the amount of deformation of portions of the brake drum 2 forced by the brake shoes 5 supported by two each shoe supports 9 and connecting members 8 is small. In this embodiment, the number of shoe supports 9 and connecting members 8 supporting the individual brake shoes 5 may be varied as appropriate so that the brake drum 2 will deform (expand) to suitably fit the shape of the brake shoes 5. Accordingly, the brake structure of this embodiment helps ensure stable contact between the brake drum 2 and the brake shoes 5 without creating irregular gaps and produce an increased braking force.

What is claimed is:

1. A brake structure of a traction machine, said brake structure comprising:
   a housing;
   a brake drum which is made rotatable about a shaft disposed on a rotary axis of the traction machine; and
   an electromagnetic brake unit built in an inner space of the brake drum for braking the rotating brake drum, the electromagnetic brake unit including:
   a plurality of movable iron cores;
   a plurality of brake shoes located on the outside of the individual movable iron cores and joined thereto by connecting members, the brake shoes having curved outer surfaces positioned face to face with a curved inner surface of the brake drum;
   a one-piece formed stationary iron core block having a plurality of stationary iron core portions joined to the individual movable iron cores via compression springs for forcing the individual brake shoes outward against the curved inner surface of the brake drum via the movable iron cores and the connecting members; and
   guiding parts disposed on an inside surface of the housing and extend along the curved inner surface of the brake drum, the guiding parts having end surfaces which face circumferential end surfaces of the brake shoes.

2. The brake structure according to claim 1, wherein the one-piece formed stationary iron core block has a hole in which the shaft is fitted.

3. The brake structure according to claim 1, wherein the electromagnetic brake unit includes at least three each movable iron cores and brake shoes.

4. The brake structure according to claim 1, wherein each of the brake shoes is joined to the corresponding movable iron core by one connecting member.

5. The brake structure according to claim 1, wherein the compression springs are a combination of springs having different properties.

6. The brake structure according to claim 1, wherein the brake shoes are joined to the movable iron cores by varying numbers of connecting members.

7. The brake structure according to claim 1 further comprising a flange having a surface perpendicular to a central axis of the shaft, wherein the one-piece formed stationary iron core block is placed against the surface perpendicular to the central axis of the shaft and fixed to the flange.

8. A brake structure of a traction machine, said brake structure comprising:

a brake drum which is made rotatable;

a stationary iron core which coils are wound in;

a movable iron core located on an outside of the stationary iron core and moved by an attractive force of the stationary iron core;

a brake shoe located on an outside of the movable iron core and joined thereto by a connecting member; and a guiding part having an end surface which faces a circumferential end surface of the brake shoe, wherein the end surface of the guiding part bears torque exerted on the brake shoe by the rotating brake drum.

* * * * *